(12) United States Patent
Lowery

(10) Patent No.: US 6,400,906 B1
(45) Date of Patent: Jun. 4, 2002

(54) ADAPTIVE PAINT MATCHING SYSTEM AND METHOD

(76) Inventor: Robert Lowery, 8247 Forest Lake Dr., Conway, SC (US) 29526

( * ) Notice: Subject to any disclaimer, the term of this patent is extended or adjusted under 35 U.S.C. 154(b) by 0 days.

(21) Appl. No.: 09/675,720

(22) Filed: Sep. 27, 2000

Related U.S. Application Data

(60) Provisional application No. 60/156,355, filed on Sep. 28, 1999, and provisional application No. 60/207,073, filed on May 25, 2000.

(51) Int. Cl.[7] .............................................. G03B 15/06
(52) U.S. Cl. ...................... 396/199; 396/544; 396/661
(58) Field of Search ................................. 396/4, 5, 199, 396/419, 544, 661

(56) References Cited

U.S. PATENT DOCUMENTS

| | | | | |
|---|---|---|---|---|
| 3,263,584 A | * | 8/1966 | Knus ........................... | 396/544 |
| 4,692,481 A | | 9/1987 | Kelly .......................... | 523/219 |
| 4,887,217 A | | 12/1989 | Sherman et al. ............ | 364/468 |
| 5,177,694 A | | 1/1993 | Graham et al. ............. | 364/526 |
| 5,212,053 A | | 5/1993 | McSweeney et al. ....... | 430/536 |
| 5,254,192 A | | 10/1993 | Speakman .................... | 156/94 |
| 5,834,054 A | | 11/1998 | Berry ........................... | 427/142 |
| 5,851,583 A | | 12/1998 | Kronenwetter .............. | 427/140 |
| 5,932,282 A | | 8/1999 | Diener et al. ............... | 427/140 |

FOREIGN PATENT DOCUMENTS

| | | | | |
|---|---|---|---|---|
| DE | 25 25 701 | 12/1976 | ............. | G01J/3/46 |
| JP | 09249000 | 9/1997 | ............ | B44D/3/00 |
| JP | 11064970 | 3/1999 | ............ | G03B/17/56 |
| WO | WO 93/13160 | 7/1993 | ............. | C08H/5/00 |

* cited by examiner

Primary Examiner—David M. Gray
(74) Attorney, Agent, or Firm—Womble Carlyle Sandridge & Rice, PLLC

(57) ABSTRACT

An improved process of matching the color of a paint to the pre-existing color of a vehicle is provided. The process includes the steps of exposing a photo-reactive film to the surface of the vehicle whose paint color is to be matched. Once exposed, pigments in the film are activated to mimic precisely the color of the vehicle. The pigments are then extracted, isolated and mixed with a neutral base paint solution, which is tinted by the pigments to match the color of the vehicle. The tinted and matched solution is used for painting or touch-up work on the vehicle.

16 Claims, 2 Drawing Sheets

ADAPTIVE PAINT MATCHING SYSTEM AND METHOD

REFERENCE TO RELATED APPLICATION

The benefit of the filing date of co-pending U.S. Provisional Patent Application serial No. 60/156,355 filed Sep. 28, 1999 and U.S. provisional Patent application, Serial No. 60/207,073, filed May 25, 2000 is claimed.

TECHNICAL FIELD

The present invention relates generally to paints and painting and more specifically to formulating paint to match the existing color of a vehicle for repair, refinishing, and touch-up painting.

BACKGROUND

Automotive paints used in repair, refinishing, and touch-up must be formulated to match the existing color of a vehicle in order to provide high quality results. Current systems and methods of matching paint colors can be complex, expensive to maintain, and somewhat inaccurate. Specifically, traditional paint matching techniques require the storage and maintenance of dozens or even hundreds of containers of expensive tints, which are tediously mixed with neutral base coat solutions to create paint of a desired color. The formulating and matching process itself is exceedingly complex and involves the use of agitator mixing racks and lids, digital scales, microviewers and color formula microfiche, portable color analyzers, computer hardware and color retrieval software, paint code color books and other manuals and accessories.

In general, when formulating paint to match a particular color, the color code of the color assigned by the vehicle manufacturer is accessed either by microfiche viewer or computer, which provides a mix of tints that will approximate the original color. However, since the color of a vehicle can change over time and the original color can vary with paint batch or for other reasons, the original formulation rarely matches the color exactly. Accordingly, tedious and careful adjustments must be made by adding small carefully measured amounts of tints to match the color of the paint exactly to the original color of a vehicle. This process can be extremely time consuming and requires the skill of an experienced and talented painter. In fact, it is widely held in the auto repair and refinishing industry that color matching is the single most costly procedure performed in any automotive body repair shop. Even with the utmost care and skill, paint easily can be ruined beyond recovery during the matching process and it is not uncommon that many gallons of expensive ruined paint are discarded by automotive repair shops each year.

Accordingly, there exists a need for an improved system and method of matching the color of automotive touch-up paint precisely to the existing color of a vehicle. Such a system and method should be simple to implement by even inexperienced personnel and should result in a touch-up paint color that matches the color of a vehicle precisely every time. The need to store large amounts of expensive tints should be eliminated as should the requirement to maintain paint color matching manuals, microfiche viewers, computers, scales, and most other equipment currently required for the matching of automotive paints. It is to the provision of such a method and system that the present invention is primarily directed.

SUMMARY OF THE INVENTION

Briefly described, the present invention, in a preferred embodiment thereof, comprises a unique and substantially improved system and method of matching touch-up paint color to the existing color of a vehicle. The system includes a photo-reactive film, which may take the form of commercial photographic film having photo-activated pigments in a photographic emulsion, and a neutral base coat solution. In one embodiment, the photo-reactive film is carried on one side of an opaque card-like substrate covered and protected from exposure to light by a removable backing. In use of such a card, the card is placed on a clean painted surface of a vehicle with the photo-reactive film facing the painted surface. The backing is then removed to expose the film to the painted surface. Over time, the film develops to an exact likeness of the color of the surface, in essence making a photograph of the surface color. More specifically, the photo-activated pigments within the film's emulsion are activated in the proper proportions to reproduce the color of the surface.

When the photo-reactive film is sufficiently exposed and fully developed, the film, which now contains the activated color pigments, is placed in an appropriate amount of solvent, which dissolves and isolates the pigments from the film substrate. The concentrated pigments are mixed with a neutral base paint solution. The pigments dissolve in the base paint solution and cause the solution to take on the exact color of the host vehicle. The resulting paint can be sprayed on the vehicle to affect repair, refinishing, or touch-up in the usual way.

As an alternative to a card with a removable protective backing, a photo-reactive film may be loaded in a standard or specialized camera, which is then used to "photograph" the surface color of the vehicle. In a preferred embodiment, a light-tight box is placed over a cleaned area of the surface and internal lighting within the box illuminates the covered surface. The camera is attached to an adapter on the box and is activated to open its shudder and expose the film to the color of the surface. The photo-reactive film thus is exposed to the surface color to activate the pigments therein. The pigments within the exposed and developed film may then be isolated and concentrated, whereupon they are added to the neutral base paint, tinting it to match the color of the vehicle.

Since the color of the resulting touch-up paint in the present invention is determined by the existing color of the vehicle rather than starting with an approximate color and making fine adjustments, an exact match is obtained every time. Further, the need to maintain large quantities of tints is eliminated as is the requirement for color manuals, computers, microfiche readers, scales, and other complex and equipment. Accordingly, the method and system of this invention addresses and solves the problems of prior art color matching schemes while at the same time providing superior results through a simple to implement process that can be performed virtually by anyone. These and other features and advantages of the invention will become more apparent upon review of the detailed description set forth below taken in conjunction with the accompanying drawing figures, which are briefly described as follows.

DETAILED DESCRIPTION OF THE PREFERRED EMBODIMENT

The invention will be described within the context of two alternate embodiments. In the first embodiment, a photo-reactive thin film is deposited on a card. The card is placed on a surface and a peel-away protective backing is removed to expose the film to the surface color. In the second embodiment, the photo-reactive film comprises a photo-graphic emulsion on standard photographic film exposed within a standard camera. The camera is used in conjunction with a light-tight box to expose the film to the surface color. In both cases, a photo-reactive film is exposed to the vehicle color to activate pigments in the film that reproduce the original color. The pigments are then used to tint a neutral base paint solution.

Figure 1:
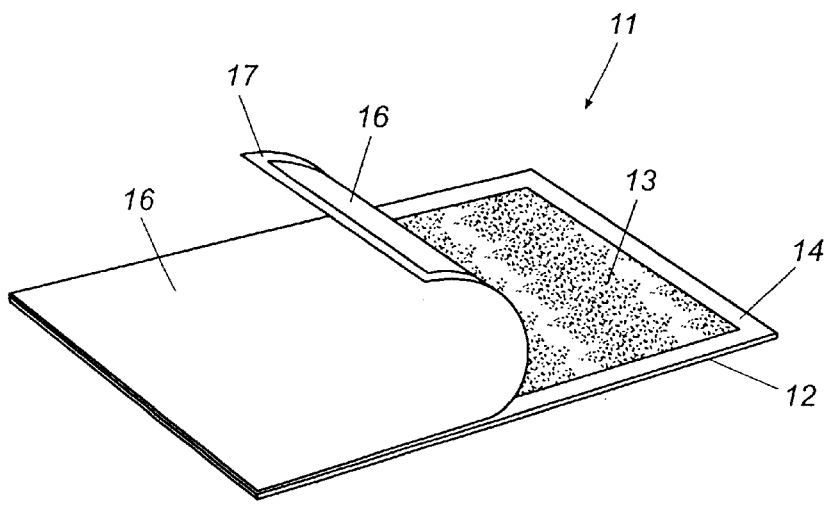
FIG. 1 is a perspective view of the photo-reactive thin film card that embodies principles of the invention in a preferred form.

Referring now in more detail to the drawings, in which like numerals refer to like parts throughout the several views, FIG. 1 illustrates a photo-reactive film card that embodies principles of the invention in one form. It should be understood that the card can take on configurations other than that shown in FIG. 1, although FIG. 1 represents a best mode known to the inventor of carrying out the invention. The photo-reactive thin film card 11 comprises a substantially rigid card-like substrate 12 upon which is deposited a layer of a photo-reactive film 13. The substrate 12 may be formed of any material suitable for carrying the film such as, for example, celluloid, aluminum, glass, or plastic and is opaque to prevent the film from being exposed to light through the substrate. Alternatively, the substrate may be coated on its back side (visible in FIG. 2) with a suitable opaque coating.

The photo-reactive film 13 is deposited on the substrate in the central portion thereof leaving an adhesive boarder 14 around the edge of the substrate. A removable peel-away protective backing 16, which also is opaque or coated with an opaque coating, has a size that corresponds to the size of the substrate 12 and is provided with an adhesive boarder 17. Normally, the removable protective backing 16 is positioned to cover the film 13 with the adhesive boarder 17 of the backing adhered to the adhesive boarder 14 of the substrate. In this way, the film 13 is sealed and protected from exposure to light until such time as it is to be exposed to the surface color of a vehicle as described below.

For exposing the film, the protective backing 16 can be pealed away from the card as illustrated in FIG. 1. The photo-reactive film contains photographic pigments that are activated when exposed to light. As is known in the photography arts, the pigments are activated in proportion to the color of the impinging light to reproduce the color on the film. In this regard, the photo-reactive film of the present embodiment and of the invention in general may be a standard commercially available photographic emulsion film such as that used in "instant photography" films.

Figure 2:
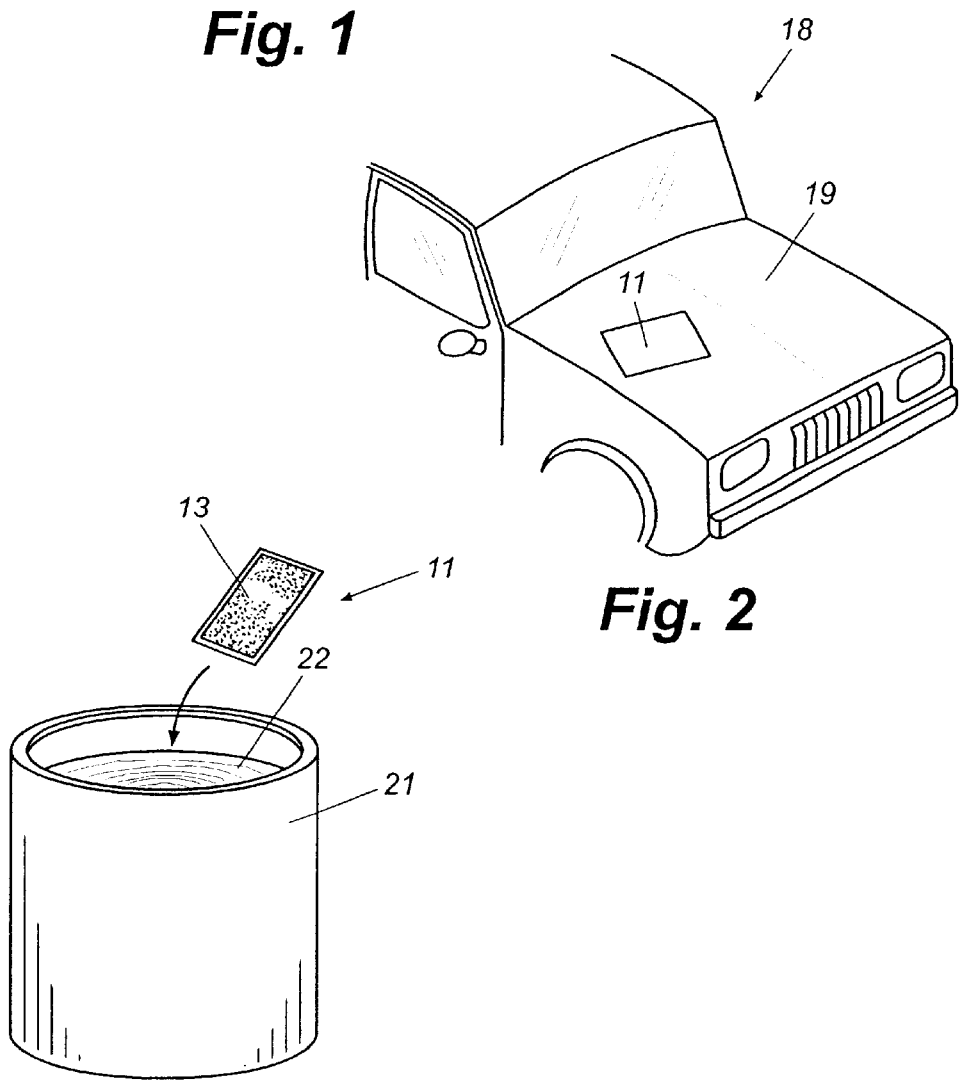
FIG. 2 illustrates placement of the photo-reactive thin film card of FIG. 1 on the surface of a vehicle whose paint color is to be matched according to one embodiment of the invention.

FIG. 2 illustrates exposure of the photo-reactive film on the card 11 to the surface of a vehicle whose paint color is to be matched. More specifically, the card is placed on the surface of the vehicle with the film layer 13 facing the surface of the vehicle. The protective backing 16 is then carefully peeled away to expose the film to the surface of the vehicle and to the color of the paint thereon. The card is left on or adjacent to the vehicle surface for a predetermined length of time sufficient to expose the photo-reactive film fully to the color of the vehicle. During this time, the film in essence takes a photograph of the color of the vehicle by absorbing light reflected from the vehicle surface and the pigments in the film are activated in the proper proportions to produce a color that precisely matches the color on the vehicle.

The photo-reactive film may be any suitable photo-reactive compound having pigments that reacts to light in accordance with the color of the light to which it is exposed. For example, compounds typically used in conventional color photographic film such as 4-N-Ethyl-N-2 Methanesulfonylaminoethyl-2-Methylphenylenediamine may be used. In fact, standard commercial photographic film is suitable for use in the present invention. Dilutants and fillers such as potassium carbonate, benzyl alcohol, and ethylene glycol may be used to fix the photo-reactive compound to the substrate.

Figure 3:
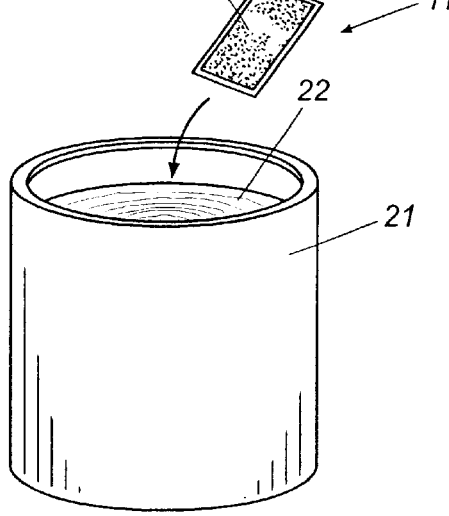
FIG. 3 illustrates placement of the exposed thin film card into a neutral base solution to dissolve activated pigments in the film that tint the solution to match the color of the vehicle.

As illustrated in FIG. 3, when the photo-reactive film of the card 11 has been exposed fully to and taken on the color of the host vehicle, it is placed in a container 21 containing a neutral base solution 22. The neutral base solution contains all of the components of automotive base coat paint except the pigment. In addition, the neutral base solution contains special solvents, activators, and chemical components that render the base solution receptive to the pigments in the exposed film. When the film on the card 11 comes into contact with these components within the neutral base solution, the pigments within the film are leached from the backing and dissolved in the solution. The base solution is tinted by the pigments and ultimately takes on the exact color of the pigments and thus of the vehicle to which the film was previously exposed.

When the photo-reactive film is exposed to the surface color of a vehicle, photo-activated pigments in the film are developed or activated to various degrees through a process similar to that used to render an image on instant photographic films. Those pigments that are not a component of the desired color are not activated. When the film is placed in the neutral base solution, the additives in the solution draw the activated pigments out of the film and into the solution, thereby transferring the color of the pre-existing finish on the vehicle into the solution. The solution thus becomes tinted to match the color of the vehicle precisely and can be used to paint repaired portions of the vehicle or to touch-up scratches and dings without having to paint an entire section of the vehicle.

Of course, certain aspects of the painted surface of a vehicle may not be adequately captured by the photo-reactive film. For instance, it is expected that the metallic finish on some cars, which is produced by blending small flecks of metal in the paint, will not be captured by the film when it is exposed to the surface and developed. Therefore, neutral base solutions specifically for use in matching metallic paints may be provided. For such neutral solutions, mica, metal flecks, or other reflective substances typically used in metallic paints may be included in the neutral base solution. Other aspects of automotive paints not capturable by the photo-reactive film may also be provided by including these aspects in special neutral base solutions.

Figure 4:
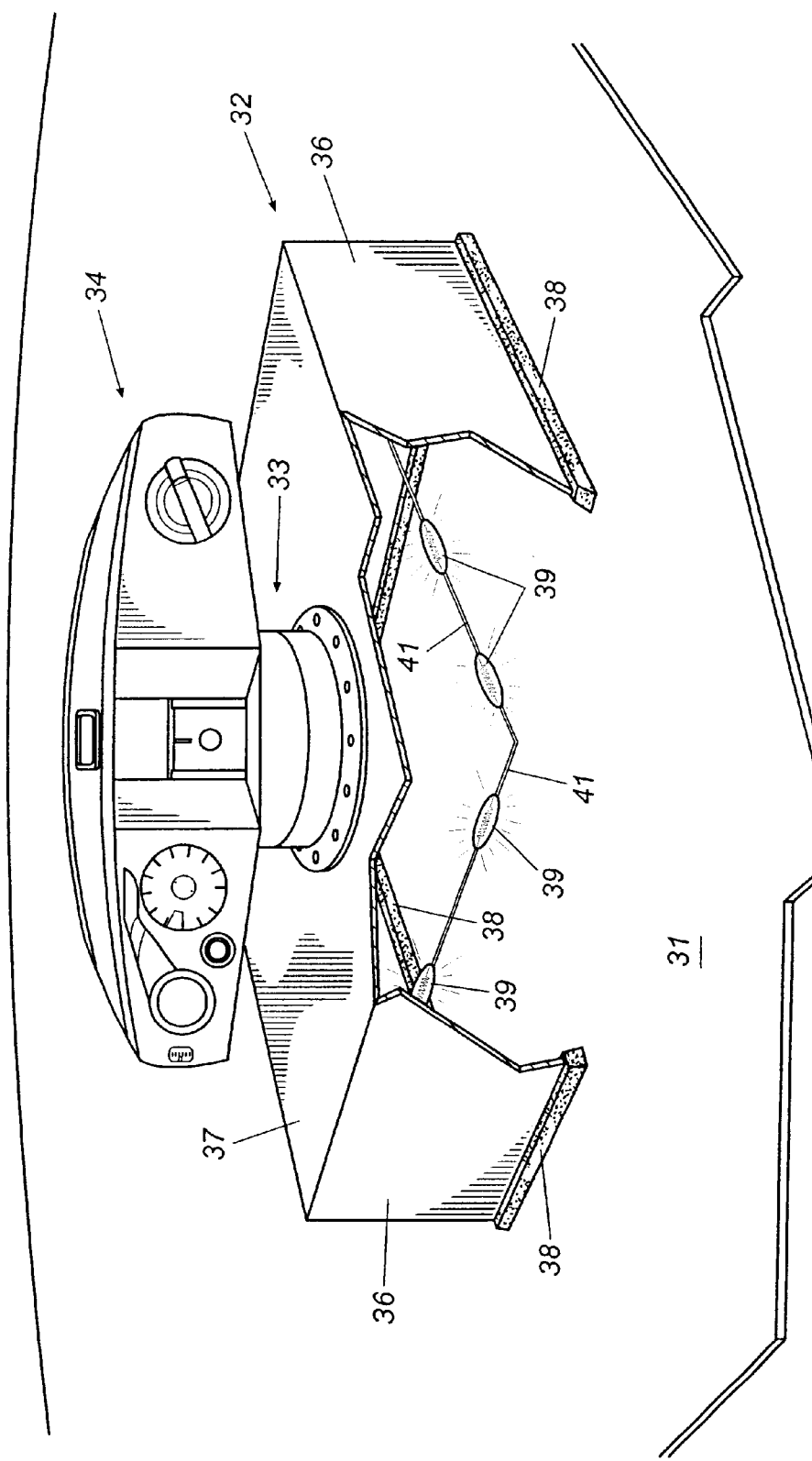
FIG. 4 illustrates an alternate embodiment of an apparatus for exposing a photo-reactive thin film to the existing color of a vehicle according to the invention.

An alternate embodiment of the invention will now be discussed within the context of FIG. 4. FIG. 4 illustrates a device that embodies an alternative technique for exposing a photo-reactive film to the color of a vehicle's paint to activate the appropriate pigments in the film. In this embodiment, a standard camera is used to house and expose the film to the surface color rather than the card of FIG. 1.

To capture consistently and effectively the true color of the initial or "donor" surface, it is necessary to create conditions at the location where the film is to be exposed whereby variables of lighting, shadow, and exposure are controlled. This is accomplished in the embodiment of FIG. 4 utilizing standard camera technology to control exposure times in conjunction with a light box to control lighting and shadow conditions.

More specifically, a light box 32, which is generally rectangular in the illustrated embodiment, has side walls 36 and a top wall 37 that are opaque. The top wall 37 is provided with an opening surrounded by a camera adapter 33 configured to receive a camera 34. The camera 34 may be any appropriate type of camera that can be loaded with film that carries a photo-reactive emulsion according to the present invention. In one embodiment, for example, the camera may be of the "instant photography" type and may be loaded with commercial instant photography film carrying a standard or specialized emulsion with photo-activated pigments. In another embodiment, the photo-reactive emulsion may be carried on standard roll film that is loaded into a roll film camera such as a 35-mm camera. In any event, the camera 34 is loaded with photo-reactive film according to the invention and may be activated to open its shudder to expose of the film for a predetermined length of time.

The camera adapter 33 forms a light-tight connection between the camera 34 and the light box 32 such that the camera is pointed through the opening in the top 37 of the light box and at the surface 31 below. The bottom edges of the side walls 36 of the light box are provided with a seal 38, which, when in contact with a donor surface 31, forms a light-tight seal between the donor surface and the light box. The seal 38 may be formed from a variety of materials including a rubberized or foam gasket material. Alternatively, a fabric or rubber skirt may be employed, especially for use in areas of the donor surface that may be characterized by curved contours. In either event, it will be seen that when the camera is attached to the light box and the light box placed on a donor surface, a completely dark light-tight chamber is formed inside the light box. In this way, stray ambient light is kept away from the region of the donor surface within the box that is to serve as the color specimen to be matched.

An array of small wattage light bulbs 39 are disposed within the light box 32, preferably around the periphery thereof as illustrated in the sectioned portion of the light box in FIG. 4. The light bulbs 39 are coupled to a source of electrical power such as a battery (not shown) by appropriate electrical wiring 41. When activated, the light bulbs provide a known amount of illumination on the area of the donor surface within the light box. Furthermore, since the illumination is provided from all directions because of the perimeter array of light bulbs, small shadows that may otherwise be formed by a directional light source are eliminated. The result is a uniformly illuminated area of the donor surface within the frame of the camera 34 that is lit with a known intensity and color of light. Thus, the lighting conditions within the box are carefully controlled and shadows are eliminated.

In the following discussion of the application of the apparatus of FIG. 4 to carry out the invention, it will be assumed that the camera 34 and film to be exposed are of the "instant photography" type. Although this is the best mode known to the inventor of carrying out the invention, it should not be interpreted to be a limitation of the invention and other types of cameras and their associated films also may be used.

When using an instant photography camera to practice the invention, commercially available instant photography films may be used. The technology underlying instant photography film, its exposure and development, is discussed in some detail in U.S. Pat. No. 2,543,181 of Edward Herbert Land and will not be described in great detail here. In general, however, when making a standard snapshot of a scene, exposure of the film to a focused image of the scene activates pigments in the film emulsion according to the colors, intensities, and patterns of light impinging on the film. Once developed, the pigments mimic the colors and other aspects of the image to produce a photograph. This same general principal applies in the present invention, except that the image focused onto the film is not a scene but rather an entire field of only one color, the color of the donor surface. Thus, in essence, an instant photograph is made of the color of the donor surface.

In practicing the invention, an area of the donor surface to be matched is thoroughly cleaned and the light box and camera are placed over the cleaned area. The lighting array is activated to illuminate the donor surface, the shudder speed of the camera is set if necessary, and the camera activated to open its shutters and expose the film within. One frame or more than one frame of film may be exposed as needed depending upon the total volume of touch-up paint that is to be produced. Once exposed, the donor surface photographs are allowed to develop as directed by the film manufacturer. In the case of instant film, development occurs on the spot. If non-instant films are used, an independent development step may be required, and this is one reason that instant films are preferred.

Once developed after exposure to the color of the donor surface, the pigments of the film are activated in the appropriate proportions to produce an entire frame that matches the color of the donor surface. The film is then immersed in a shallow bath, preferably face up, of an appropriate solvent suitable for dissolving these pigments, which are contained in a film emulsion. The solvent bath should be of a size and depth to cover the surface of the exposed film with a minimum volume of solvent. A clean soft bristle paintbrush or similar utensil may be used to insure that all of the pigments are leached from the film substrate and dissolved in the solvent. Solvents suitable for dissolving the pigmented emulsion on the film include, without limitation, acetone, Methyl Ethyl Keytone (MEK), toluene, xylene, or lacquer thinner depending upon the chemical composition of the emulsion.

Once the pigments are dissolved in the solvent, the resulting solution is concentrated by an appropriate means such as straining, evaporation, or otherwise to obtain a small amount of concentrated pigments. For making a standard volume of 200 ml of matched touch-up paint, about 50 ml of concentrated pigments is required.

A neutral base coat preparation comprising an appropriate epoxy, urethane, or clear lacquer without added pigments is prepared as discussed above. The base coat must be of such formulation as not to impart any incident coloration if applied directly. The base coat also should contain UV inhibiting compounds insofar as they do not impart coloration to the base coat. The base coat must be compatible with the dissolved pigments obtained above.

For mixing 200 ml of touch-up paint, about 50 ml of the pigment concentrate is transferred to a separate container with 150 ml of neutral base coat and the two are mixed thoroughly to dissolve the pigments in the base coat. Thus, a preferred ratio of pigments to base coat is about 1 part pigments to about 3 parts neutral base coat. The resulting touch-up paint, which matches the color of the vehicle, may be stored until needed. The touch-up paint may be applied by any appropriate process, such as spraying, as is known by those of skill in the art.

The invention has been described herein in terms of preferred embodiments and methodologies. It will be obvious to those of skill in the art, however, that various additions, deletions, and modifications may be made to the illustrated embodiments within the scope of the invention. For example, the card and removable backing that carry and protect the photo-reactive film in the embodiment of FIG. 1 may take on a variety of shapes or configurations. Further, the peel-away protective backing might be replace altogether with, for example, a movable or slidable shutter that can be drawn aside to expose the film to the color of a vehicle's paint. The method of the invention generally comprises the steps of exposing a photo-reactive film to a color to be matched and then placing the exposed film in a neutral base solution adapted to draw appropriate pigments out of the film to tint the base solution to match the color of the vehicle. However, the process may well be varied by those of skill in the art. For example, it is envisioned that the photo-reactive film may need to be developed after exposure. In this case, of course, the process would include steps related to the requisite development of the film prior to isolating the pigments and mixing them in a neutral base solution. These and other modifications may be made by those of skill in the art without departing from the spirit and scope of the invention as set forth in the claims.

What is claimed is:

1. A method of matching the color of a paint to a pre-existing color comprising the steps of:
    (a) providing a photo-reactive film;
    (b) exposing the photo-reactive film to the color to be matched to activate color pigments in the film;
    (c) isolating the pigments; and
    (c) mixing the pigments with a neutral base solution to tint the solution to match the color to which the film was exposed.

2. The method of claim 1 and wherein the color to be matched is the color of a vehicle.

3. The method of claim 1 and wherein step (b) comprises placing the photo-reactive film in a camera and photographing the color to be matched.

4. The method of claim 3 and further comprising placing a light-tight box over the color to be matched, attaching the camera to the light-tight box, illuminating the interior of the light-tight box, and activating the camera.

5. The method of claim 4 and wherein the step of illuminating the interior of the light-tight box comprises activating an array of bulbs disposed within the light-tight box.

6. The method of claim 5 and wherein the array of bulbs are arrayed around the interior of the light-tight box.

7. The method of claim 6 and wherein the light-tight box includes a perimeter seal for sealing out ambient light from the interior of the light-tight box.

8. A method of matching touch-up paint to the existing color of a vehicle comprising the steps of:
    (a) exposing a photo-reactive emulsion to the surface of the vehicle in a region to be color matched to activate color pigments in the emulsion;
    (b) isolating the pigments; and
    (c) mixing the isolated pigments with a base to tint the base to match the color of the surface.

9. A method of matching touch-up paint as claimed in claim 8 and wherein step (a) comprises loading a camera with film coated with the emulsion and photographing the surface of the vehicle.

10. A method of matching touch-up paint as claimed in claim 9 and wherein step (a) further comprises placing a light-tight box on the surface of the vehicle, attaching the camera to the light-tight box, illuminating the interior of the light-tight box, and activating the camera.

11. A method of matching touch-up paint as claimed in claim 8 and wherein step (b) includes placing the emulsion in a solvent to dissolve the pigments in the solvent and evaporating a predetermined amount of the solvent to concentrate the pigments.

12. A method of matching touch-up paint as claimed in claim 8 and where in step (c), the pigments are mixed with the base in the proportion of about 1 part pigments to about 3 parts base.

13. A touch-up paint formulated according the method of claim 8.

14. A method of formulating paint to match the color of an existing painted surface comprising the steps of photographing the existing painted surface, extracting color pigments from the photograph, and mixing the color pigments with a neutral base solution.

15. The method of claim 14 and wherein the step of photographing the painted surface comprises photographing the painted surface with instant photography film and wherein the step of extracting the color pigments comprises bathing the photograph in a solvent solution.

16. The method of claim 14 and wherein the step of photographing the existing painted surface comprising covering a section of the existing painted surface with a light box, mounting a camera to the light box, illuminating the interior of the light box to light the covered section of the existing painted surface, and activating the camera.

* * * * *